(12) United States Patent
Jost et al.

(10) Patent No.: US 11,235,689 B2
(45) Date of Patent: Feb. 1, 2022

(54) OCCUPANT PROTECTION SYSTEM INCLUDING SEAT-BACK ACTUATOR SYSTEM

(71) Applicant: Zoox, Inc., Foster City, CA (US)

(72) Inventors: Markus Jost, Hofheim (DE); Andrew John Piper, Palo Alto, CA (US); Andrew Frank Raczkowski, San Jose, CA (US); Kern Rameshwar Sharma, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 100 days.

(21) Appl. No.: 16/370,637

(22) Filed: Mar. 29, 2019

(65) Prior Publication Data

US 2021/0221263 A1     Jul. 22, 2021

(51) Int. Cl.
*B60N 2/427* (2006.01)
*B60N 2/02* (2006.01)
*B60N 2/01* (2006.01)

(52) U.S. Cl.
CPC ........... *B60N 2/427* (2013.01); *B60N 2/0276* (2013.01); *B60N 2/01* (2013.01)

(58) Field of Classification Search
CPC ........ B60N 2/427; B60N 2/0276; B60N 2/01; B60R 21/207; B60R 21/013; B60R 21/01554; B60R 21/33
USPC ....................................................... 180/271
See application file for complete search history.

(56) References Cited

U.S. PATENT DOCUMENTS

| | | |
|---|---|---|
| 3,000,020 A | 9/1961 | Lombard |
| 5,580,124 A | 12/1996 | Dellanno |
| 5,769,489 A | 6/1998 | Dellanno |
| 6,820,930 B2 | 11/2004 | Dellanno |
| 7,090,292 B2 | 8/2006 | Dellanno |
| 8,630,772 B2* | 1/2014 | Ieda ..................... B60R 21/0134 701/45 |
| 9,527,421 B2 | 12/2016 | Hulway |
| 10,343,557 B2* | 7/2019 | Akaike ................. B61D 33/00 |
| 10,647,286 B1* | 5/2020 | Dennis ................ B60R 21/2338 |
| 10,696,196 B2* | 6/2020 | Yetukuri .............. B60N 2/0244 |
| 2005/0140190 A1 | 6/2005 | Kawashima |

(Continued)

OTHER PUBLICATIONS

Office Action for U.S. Appl. No. 16/664,069, dated Jun. 9, 2021, Baer, "Occupant Protection System and Method Including Seatback" 9 pages.

*Primary Examiner* — James A Shriver, II
*Assistant Examiner* — Hilary L Johns
(74) *Attorney, Agent, or Firm* — Lee & Hayes, P.C.

(57) ABSTRACT

An occupant protection system for a vehicle may include a seat-back actuator system, including a seat-back actuator configured to move a portion of a seat toward a back of an occupant of the vehicle during a collision in which the occupant is facing opposite a direction of travel of the vehicle. The seat-back actuator system may also include an actuator controller configured to receive a triggering signal indicative of one or more of an actual change in velocity of the vehicle, a predicted change in velocity of the vehicle, a collision, or a predicted collision, and cause the seat-back actuator to move the seat toward the back of the occupant. By moving the seat toward the back of the occupant, a maximum rate of change of velocity of the back of the person may be reduced, reducing the likelihood or severity of injury to the occupant due to the collision.

22 Claims, 5 Drawing Sheets

(56) References Cited

U.S. PATENT DOCUMENTS

| | | | |
|---|---|---|---|
| 2006/0202492 A1 | 9/2006 | Barvosa-Carter et al. | |
| 2011/0221247 A1* | 9/2011 | Hashimoto | B60N 2/4279 |
| | | | 297/216.13 |
| 2013/0257119 A1 | 10/2013 | Roberts | |
| 2015/0375865 A1* | 12/2015 | Fischer | B60N 2/77 |
| | | | 701/49 |
| 2017/0291511 A1* | 10/2017 | Akaike | B60N 2/427 |
| 2017/0349068 A1 | 12/2017 | Dry et al. | |
| 2018/0134191 A1 | 5/2018 | Ketels et al. | |
| 2018/0134192 A1 | 5/2018 | Wittenschlaeger et al. | |
| 2018/0170215 A1* | 6/2018 | Yetukuri | B60N 2/0276 |
| 2019/0303729 A1* | 10/2019 | Gramenos | G06K 9/00832 |
| 2020/0062146 A1* | 2/2020 | Freienstein | B60R 21/01554 |
| 2020/0079245 A1 | 3/2020 | Rowe et al. | |
| 2020/0171985 A1* | 6/2020 | Yetukuri | B60N 2/4221 |
| 2020/0216006 A1* | 7/2020 | Jaradi | B60N 2/143 |
| 2020/0223325 A1 | 7/2020 | Pinkelman et al. | |
| 2020/0282877 A1 | 9/2020 | Gajda et al. | |
| 2020/0298784 A1 | 9/2020 | Bonk | |
| 2021/0122270 A1 | 4/2021 | Baer et al. | |

\* cited by examiner

OCCUPANT PROTECTION SYSTEM INCLUDING SEAT-BACK ACTUATOR SYSTEM

BACKGROUND

During a vehicle collision, injuries to an occupant of the vehicle may result from the occupant contacting a surface inside the vehicle during the collision. As the difference between the speed of the occupant and the speed of the surface the occupant contacts increases, the force to which the occupant is subjected also increases, thereby increasing the likelihood or severity of injury to the occupant during the collision. Conventional seatbelts and airbags attempt to reduce the effects of collisions by preventing or reducing the likelihood of the occupant contacting an interior surface and/or reducing the difference between the speed of the occupant and the speed of any surface the occupant contacts. However, conventional seatbelts and airbags may not provide sufficient protection to an occupant during certain collision conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
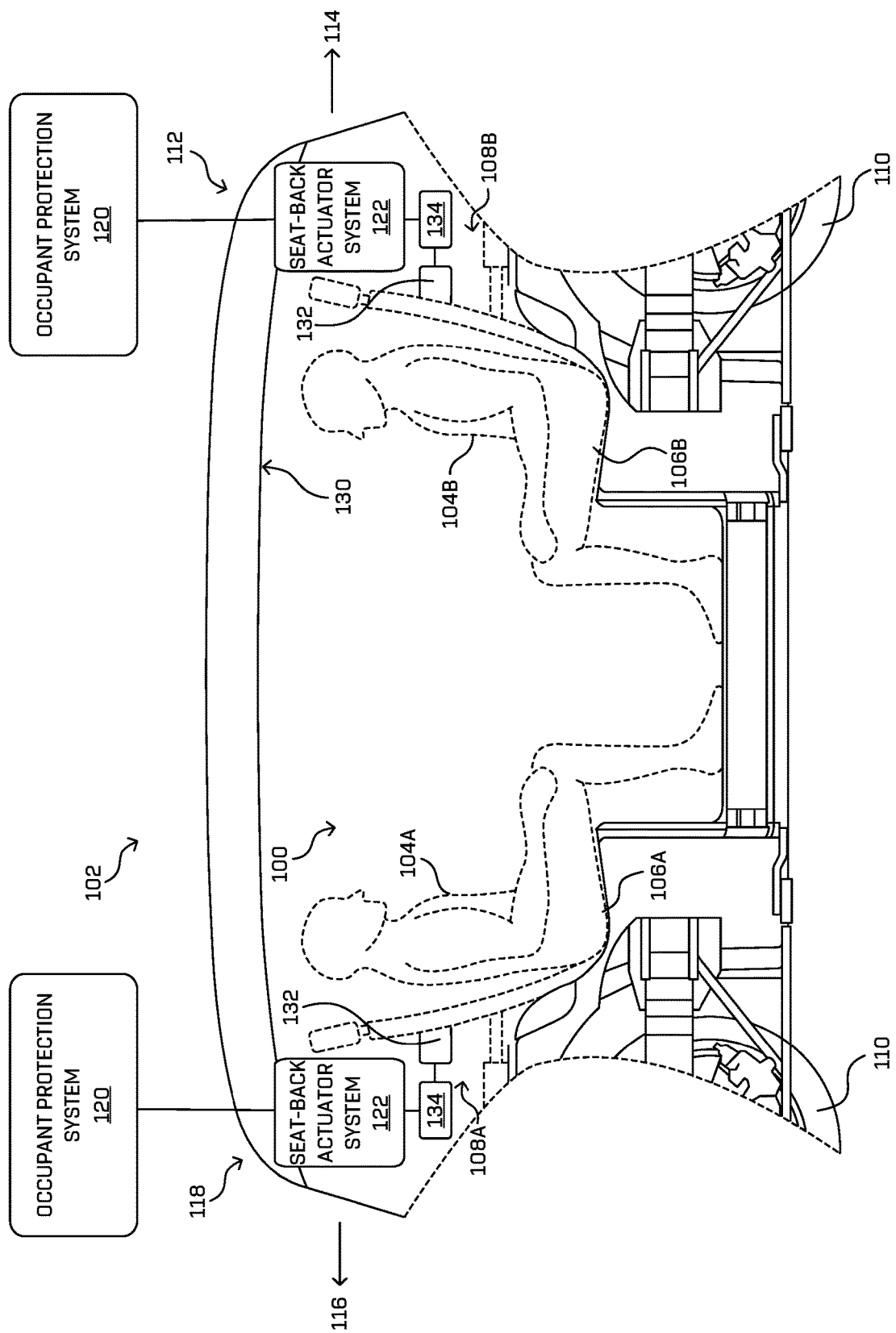
FIG. 1 is a cutaway side view of an example vehicle including an example occupant protection system including a seat-back actuator system.

As mentioned above, during a vehicle collision, injuries to an occupant of the vehicle may result from the occupant contacting a surface inside the vehicle during the collision. As a difference between the speed of the occupant and the speed of the surface the occupant contacts increases, the force to which the occupant is subjected also increases, thereby increasing the likelihood or severity of injuries to the occupant during the collision. Conventional seatbelts and airbags attempt to reduce the effects of collisions by preventing or reducing the likelihood of the occupant contacting an interior surface and/or reducing the difference between the speed of the occupant and the speed of any surface the occupant contacts. However, conventional seatbelts and airbags may not provide sufficient protection to an occupant during certain collision conditions.

For example, when an occupant is seated facing the same direction as the direction of travel of the vehicle, and a collision occurs from behind the vehicle, for example, when another vehicle collides with a trailing end of the vehicle in which the occupant is traveling, the seat back of the seat in which the occupant is sitting may be propelled into the back of the occupant by the force of the collision. As the difference between the speed of the occupant and the speed of the seat back increases, so does the force of impact absorbed by the occupant, thereby increasing the likelihood or severity of injury to the occupant during the collision. In another example, when an occupant is seated facing a direction opposite the direction of travel of the vehicle and a collision occurs with the leading end of the vehicle, for example, when the leading end of the vehicle collides with another vehicle or object, the back of the occupant is thrown into the seat back of the seat in which the occupant is sitting. As the difference between the speed of the occupant and the speed of the seat back increases, so does the force of impact absorbed by the occupant, thereby increasing the likelihood or severity of injury to the occupant during the collision.

This disclosure is generally directed to apparatuses, systems, and methods for reducing the likelihood or severity of injury to an occupant during a collision. In at least some examples, techniques provided herein, may mitigate injuries/damages in which 1) an impact to the trailing end of the vehicle occurs while the occupant is seated facing the direction of travel, or 2) an impact occurs to the leading end of the vehicle while the occupant is seated facing the trailing end of the vehicle (e.g., opposite the direction of travel), though any other direction of travel and occupant position is contemplated. In some examples, a seat-back actuator system may cause at least a portion of a seat in which an occupant is seated to move toward the back of the occupant before, during, and/or after the collision. In some examples, the portion of the seat that is moved toward the back of the occupant may include the seat back, the seat bottom, and/or the headrest. This may serve to reduce the likelihood and/or severity of injury to the occupant during certain types of collisions. For example, when seated in a vehicle seat, a space may exist between at least a portion of a back of an occupant of the seat and a front surface of a seat back of the seat facing the back of the occupant. When a collision occurs to the trailing end of the vehicle with the occupant facing forward, the front surface of the seat back is propelled through the space and into the back of the occupant. By engaging the occupant with the portion of the seat sooner, or in effect coupling the occupant to the vehicle, the force of impact can be absorbed over greater distance and a longer period of time, thereby decreasing the maximum rate of change of speed (i.e., deceleration) of the occupant and minimizing the resultant force applied to the occupant.

When a collision to the leading end of the vehicle occurs with the occupant seated facing the trailing end of the vehicle relative to the direction of travel, as the seat back slows or stops as a result of the collision, the back of the occupant continues to travel through the space and toward the front surface of the seat back. The force absorbed by the back of the occupant increases as the rate of change of the velocity resulting from the impact with the seat back increases. In some examples, by moving a portion of the seat (e.g., the seat back, the seat bottom, and/or the headrest) toward the back of the occupant before, during, and/or after the collision, for example, to eliminate or minimize the space, the maximum rate of change of the velocity is reduced, thereby reducing the likelihood and/or severity of injury suffered by the occupant during such collisions.

This disclosure is generally directed to an occupant protection system for a vehicle. The occupant protection system may include a seat configured to be coupled to a vehicle. The seat may include a seat base configured to support at least a portion of a weight of an occupant of the seat, a seat back associated with the seat base and configured to provide support to a back of the occupant, and a headrest configured to support a head and/or neck of an occupant. The occupant protection system may also include a seat-back actuator system. The seat-back actuator system may include a seat-back actuator configured to move at least a portion of the seat (e.g., the seat base, the seat back, and/or the headrest) toward at least a portion of the back of the occupant of the vehicle. In some examples, the seat-back actuator may be configured to move one or more of the different portions of the seat differently (e.g., through different ranges of motion, through different ranges of angles of motion, and/or at different rates of motion). The seat back actuator system may also include an actuator controller in communication with the seat-back actuator and configured to receive a triggering signal indicative of one or more of an actual change in velocity of the vehicle or a predicted change in velocity of the vehicle. In some examples, the triggering signal may be indicative of an actual collision and/or a predicted collision involving the vehicle. The actuator controller may also be configured to cause, based at least in part on the triggering signal, the seat-back actuator to move at least a portion of the seat (e.g., the seat back) toward at least a portion of the back of the occupant, for example, in a direction opposite a direction of travel of the vehicle. In some examples, the movement of the at least a portion the seat may be a translational movement, for example, not including a pivoting of the seat itself or a pivoting of the seat back relative to the seat base.

In some examples, the seat-back actuator may include an expandable bladder configured to expand from a stowed state to a deployed state. For example, the seat-back actuator system may include one or more inflators in flow communication with the expandable bladder and configured to cause to the expandable bladder to expand from the stowed state to the deployed state. In some examples, the seat back may define a cavity, and the expandable bladder may be at least partially received within the cavity. In some such examples, the seat back may define a front surface configured to face toward at least a portion of the back of the occupant and a rear surface opposite the front surface. The cavity may be defined between the front surface and the rear surface, and the expandable bladder may be configured, upon activation, to generate a force to move the front surface away from the rear surface, for example, toward at least a portion of the back of the occupant. In some examples, the expandable bladder may be coupled to a rear surface of the seat and a portion of the vehicle. In some such examples, the expandable bladder may be configured, upon activation, to expand and apply a force to the rear surface of the seat to move the seat back toward at least a portion of the back of the occupant.

In some examples, the seat-back actuator may include one or more of a pneumatic cylinder, a hydraulic cylinder, or an electric actuator. In some such examples, a first portion of the seat-back actuator may be coupled to the seat back and a second portion of the seat-back actuator may be configured to be coupled to a portion of the vehicle, for example, and may be configured to, upon activation, apply a force to the seat back to move the seat back toward at least a portion of the back of the occupant.

This disclosure is also generally directed to a method for protecting an occupant of a vehicle, for example, during one or more of the above-noted types of collisions. The method may include receiving a triggering signal indicative of at least one of an actual change in velocity of the vehicle, a predicted change in velocity of the vehicle, a collision involving the vehicle, or a predicted collision involving the vehicle. The method may also include causing, based at least in part on the triggering signal, a seat-back actuator to move at least a portion of a seat back of a seat relative to a seat base and toward at least a portion of a back of the occupant. In some such examples, the method may also include receiving an occupant presence signal indicative of a presence of an occupant in the seat, and causing, based at least in part on the occupant presence signal, the seat-back actuator to move at least a portion of the seat back of the seat toward at least a portion of the back of the occupant, for example, in a direction opposite a direction of travel of the vehicle. For example, the method may include determining, based at least in part on the occupant presence signal, that the occupant is facing rearward relative to a direction of travel of the vehicle, and causing, based at least in part on the determination, the seat-back actuator to move at least a portion of the seat back of the seat toward at least a portion of the back of the occupant.

The techniques and systems described herein may be implemented in a number of ways. Example implementations are provided below with reference to the figures.

FIG. 1 is a side cutaway view showing an interior 100 of an example vehicle 102 including a pair of occupants 104 (e.g., occupants 104A and 104B). The example vehicle 102 may be configured to travel via a road network from one geographic location to a destination carrying one or more of the occupants 104. For example, the interior 100 may include a plurality of seats 106 (e.g., seats 106A and 106B), hick may be provided in any relative arrangement. The example vehicle 102 shown in FIG. 1 includes an example carriage-style seating arrangement in a substantially central portion of the interior 100 of the vehicle 102. For example, the vehicle 102 may include two or more rows 108 (e.g., rows 108A and 108B) of seats 106, and in some examples, two of the rows 108 of seats 106 may face each other, for example, as shown in FIG. 1. One or more of the rows 108 of seats 106 may include two seats 106. In some examples, one or more of the two seats 106 may be a bench-style seat configured to provide seating for one or more occupants 104. Other relative arrangements and numbers of seats 106 are contemplated.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any groundborne, airborne, or waterborne vehicle, including those ranging from vehicles that need to be manually controlled by a driver at all times, to those that are partially- or fully-autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 112 of the vehicle 102 is the leading end of the vehicle 102 when travelling in a first direction 114, and such that the first end 112 becomes the trailing end of the vehicle 102 when traveling in the opposite, second direction 116, as shown in FIG. 1. Similarly, a second end 118 of the vehicle 102 is the leading end of the vehicle 102 when travelling in the second direction 116, and such that the second end 118 becomes the trailing end of the vehicle 102 when traveling in the opposite, first direction 114. These example characteristics may facilitate greater maneuverability, for example, in small spaces or crowded environments, such as parking lots and urban areas.

As shown in FIG. 1, the vehicle 102 may include an occupant protection system 120 configured to protect one or more of the occupants 104 during a collision involving the vehicle 102. For example, the occupant protection system 120 may include a seat-back actuator system 122 configured to move at least a portion of one or more of the seats 106 (e.g., a seat base, a seat back, and/or a headrest) toward at least a portion of a back 126 of one or more of the occupants 104 during a predicted collision and/or an actual collision of the vehicle 102. For example, as shown in FIG. 1, each of the example seats 106 includes a seat back 124 configured to at least partially support at least a portion of the back 126 of an occupant 104. When seated, a portion of the back 126 of the occupant 104 may be spaced from a front surface 128 of the seat back 124 by a space 130. As described in more detail herein, in some examples, the seat-back actuator system 122 may be configured to move at least a portion of the front surface 128 of the seat back 124 toward at least a portion of the back 126 of occupant 104 during a predicted collision and/or an actual collision of the vehicle 102, for example, such that at least a portion of the space 130 is eliminated to reduce the likelihood of injury to the occupant 104 or to reduce the severity of injury to the occupant 104 during the collision. Although FIG. 1 shows two separate occupant protection systems 120 and two separate seat-back actuator systems 122 for clarity, some examples may include only a single occupant protection system 120 (or more than two) and/or only a single seat-back actuator system 122 (or more than two), for example, coupled to multiple seat-back actuators 134.

For example, as shown in FIG. 1, the seat-back actuator system 122 may include a seat-back actuator 132 configured to move at least a portion of the beat back 124 toward at least a portion of the back 126 of the occupant 104, and an actuator controller 134 in communication with the seat-back actuator 132. In some examples, the actuator controller 134 may be configured to receive one or more signals from one or more sensors indicative of a predicted collision or an actual collision, and based at least in part on the one or more signals, cause the seat-back actuator 132 to move at least a portion of the seat back 124 toward the at least a portion of the back 126 of the occupant 104, for example, as described herein. The actuator controller 134 may receive one or more signals indicative of parameters other than the one or more signals indicative of a predicted or actual collision, and based at least in part on the one or more signals indicative of the other parameters, cause the seat-back actuator 132 to move at least a portion of the seat back 124 toward the at least a portion of the back 126 of the occupant 104. Although FIG. 1 shows two separate occupant protection systems 120 and two separate seat-back actuator systems 122 for clarity, some examples may include only a single occupant protection system 120 (or more than two) and/or only a single seat-back actuator system 122 (or more than two), for example, coupled to multiple seat-back actuators 134.

Figure 2:
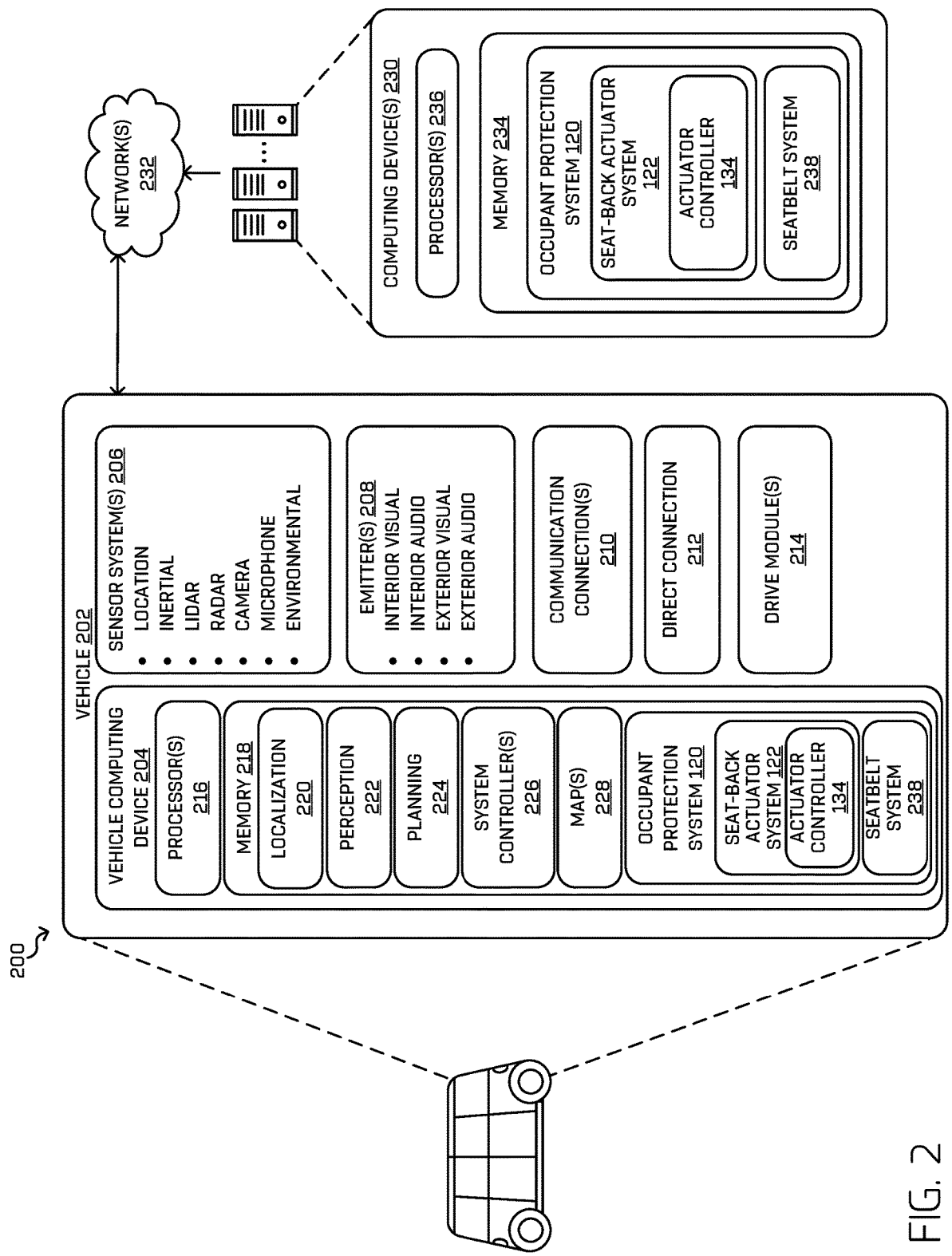
FIG. 2 is a block diagram of an example system for implementing the techniques described herein.

FIG. 2 depicts a block diagram of an example system 200 for implementing the techniques described herein. In at least some examples, the system 200 may include a vehicle 202, which may correspond to the example vehicle 102 shown in FIG. 1. The vehicle 202 may include a vehicle computing device 204, one or more sensor systems 206, one or more emitters 208, one or more communication connections 210, at least one direct connection 212, and one or more drive modules 214.

The vehicle computing device 204 may include one or more processors 216 and memory 218 communicatively coupled with the one or more processors 216. In the illustrated example, the vehicle 202 is an autonomous vehicle. However, the vehicle 202 may be any other type of vehicle. In the illustrated example, the memory 218 of the vehicle computing device 204 stores a localization component 220, a perception component 222, a planning component 224, one or more system controllers 226, one or more map(s) 228, and an example occupant protection system 120. Though depicted in FIG. 2 as residing in memory 218 for illustrative purposes, it is contemplated that the localization component 220, the perception component 222, the planning component 224, the one or more system controllers 226, the one or more maps 228, and the occupant protection system 120 may additionally, or alternatively, be accessible to the vehicle 202 (e.g., stored on, or otherwise accessible by, memory remote from the vehicle 202).

In at least one example, the localization component 220 may be configured to receive data from the sensor system(s) 206 to determine a position and/or orientation of the vehicle 202 (e.g., one or more of an x-, y-, z-position, roll, pitch, or yaw). For example, the localization component 220 may include and/or request/receive a map of an environment and may continuously determine a location and/or orientation of the autonomous vehicle within the map. In some examples, the localization component 220 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 220 may provide data to various components of the vehicle 202 to determine an initial position of an autonomous vehicle for generating a candidate trajectory, as discussed herein.

In some examples, the perception component 222 may be configured to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In at least one example, the planning component 224 may determine a location of a user based on image data of an environment received from the user using, for example, bags of binary words with image-based features, artificial neural network, and the like. Further, the planning component 224 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 202 may stop to pick up a passenger. In at least one example, the planning component 224 may determine a pickup location based at leak in part on determining a user identity (e.g., determined via image recognition or received as an indication from a user device, as discussed herein).

In at least one example, the vehicle computing device 204 may include one or more system controllers 226, which may be configured to control steering, propulsion, braking, safety, emitters, communication, and other systems of the vehicle 202. These system control(s) 226 may communicate with and/or control corresponding systems of the drive module(s) 214 and/or other components of the vehicle 202.

The memory 218 may further include one or more map(s) 228 that may be used by the vehicle 202 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BREW information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 228 may include at least one map (e.g., images and/or a nesh). In some examples, the vehicle 202 may be controlled based at least in part on the maps 228. That is, the maps 228 may be used in connection with the localization component 220, the perception component 222, and/or the planning component 224 to determine a location of the vehicle 202, identify objects in an environment, and/or generate routes and/or trajectories to navigate within an environment.

In some examples, the one or more map(s) 228 may be stored on a remote computing device(s) (such as computing device(s) 230) accessible via one or more network(s) 232. In some examples, multiple maps 228 may be stored based on, for example, a characteristic (e.g., type of entity, time of day, day of week, season of the year, etc.). Storing multiple maps 228 may have similar memory requirements but increase the speed at which data in a map may be accessed.

As shown in FIG. 2, in some examples, the occupant protection system 120 may be stored in the memory 218 of the computing device 204 of the vehicle 202 or remote from the vehicle 202 in the memory 234 of the computing device(s) 230. In some examples, some portions of the occupant protection system 120 may be stored in the memory 218 of the computing device 204 of the vehicle 202, and other portions of the occupant protection system 120 may be stored remotely in the memory 234 of the computing device(s) 230, and the separately located portions of the occupant protection system 120 may operate together in a coordinated manner.

In some examples, aspects of some or all of the components discussed herein may include any models, algorithms, and/or machine learning algorithms. For example, in some examples, the components in the memory 218 and/or the memory 234 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CRAM), decision stump, conditional decision trees). Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (Mending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 206 may include LIDAR sensors, radar sensors, ultrasonic transducers, sonar sensors, location sensors (e.g., GPS, compass, etc.), inertial sensors (e.g., inertial measurement units (BTUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 206 may include multiple examples of each of these or other types of sensors. For example, the LIDAR sensors may include individual LIDAR sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing device 204. Additionally, or alternatively, the sensor system(s) 206 may send sensor data, via the one or more networks 232, to the one or more computing device(s) 230 at a particular frequency, after a lapse of a predetermined period of time, in near real-time, etc.

The vehicle 202 may also include one or more emitters 208 for emitting light and/or sound, as described above. The emitters 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 202 may also include one or more communication connection(s) 210 that enable communication between the vehicle 202 and one or more other local or remote computing device(s). For example, the communication connection(s) 210 may facilitate communication with other local computing device(s) on the vehicle 202 and/or the drive module(s) 214. Also, the communication connection(s) 210 may allow the vehicle 202 to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 may include physical and/or logical interfaces for connecting the vehicle computing device 204 to another computing device or a network, such as network(s) 232. For example, the communications connection(s) 210 may enable Wi-Fi-based communication, such as via frequencies defined by the IEEE 802.11 standards, short range wireless frequencies such as Bluetooth®, cellular communication (e.g., 2G, 3G, 4G, 4G LYE, 5G, etc.) or any suitable wired or wireless communications protocol that enables the respective computing device to interface with the other computing device(s).

In at least one example, the vehicle 202 may include one or more drive modules 214. In some examples, the vehicle 202 may have a single drive module 214. In at least one example, if the vehicle 202 has multiple drive modules 214, individual drive modules 214 may be positioned on opposite ends of the vehicle 202 (e.g., the leading end and the rear, etc.). In at least one example, the drive module(s) 214 may include one or more sensor systems to detect conditions of the drive module(s) 214 and/or the surroundings of the vehicle 202. By way of example and not limitation, the sensor system(s) 206 may include one or more wheel encoders (e.g., rotary encoders) to sense rotation of the wheels (e.g., wheels 110 in FIG. 1) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 214. In some cases, the sensor system(s) on the drive module(s) 214 may overlap or supplement corresponding systems of the vehicle 202 (e.g., sensor system(s) 206).

The stopped here drive module(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system other electrical components such as a DC/DC converter, a high voltage junction, a high voltage cable, charging system, charge port, etc.). Additionally, the drive module(s) 214 may include a drive module controller, which may receive and preprocess data from the sensor system(s) 206 and to control operation of the various vehicle systems. In some examples, the drive module controller may include one or more processors and memory communicatively coupled with the one or more processors. The memory may store one or more modules to perform various functionalities of the drive module(s) 214. Furthermore, the drive module(s) 214 also include one or more communication connection(s) that enable communication by the respective drive module with one or more other local or remote computing device(s).

In at least one example, the direct connection 212 may provide a physical interface to couple the one or more drive module(s) 214 with the body of the vehicle 202. For example, the direct connection 212 may allow the transfer of energy, fluids, air, data, etc. between the drive module(s) 214 and the vehicle 202. In some examples, the direct connection 212 may further releasably secure the drive module(s) 214 to the body of the vehicle 202.

In at least one example, the localization component 220, perception component 222, the planning component 224, and/or the occupant protection system 120 may process sensor data, as described above, and may send their respective outputs, over the one or more network(s) 232, to one or more computing device(s) 230. In at least one example, the localization component 220, the perception component 222, the planning component 224, and/or the occupant protection system 120 may send their respective outputs to the one or more computing device(s) 230 at a particular frequency, after a lapse of a predetermined period of time, in near real-time, etc.

The processor(s) 216 of the vehicle 202 and/or the processor(s) 236 of the computing device(s) 230 may include any suitable processor capable of executing instructions to process data and perform operations as described herein. By way of example and not limitation, the processor(s) 216 and 236 may include one or more Central Processing Units (CPUs), Graphics Processing Units (CPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218 and 234 are examples of non-transitory computer-readable media. The memory 218 and 234 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, for example as shown in FIG. 2, the occupant protection system 120 may include the seat-back actuator system 122, including the actuator controller 134, and/or a seatbelt system 238. As shown in FIG. 2, the seat-back actuator system 122 and the seatbelt system 238 may be associated with one or more of the vehicle computing device 204 on board the vehicle 202 or the remote computing device(s) 230.

It should be noted that while FIG. 2 is illustrated as a distributed system, in alternative examples, components of the vehicle 202 may be associated with the computing device(s) 230, and/or components of the computing device(s) 230 may be associated with the vehicle 202. That is, the vehicle 202 may perform one or more of the functions associated with the computing device(s) 230, and vice versa.

Figure 3:
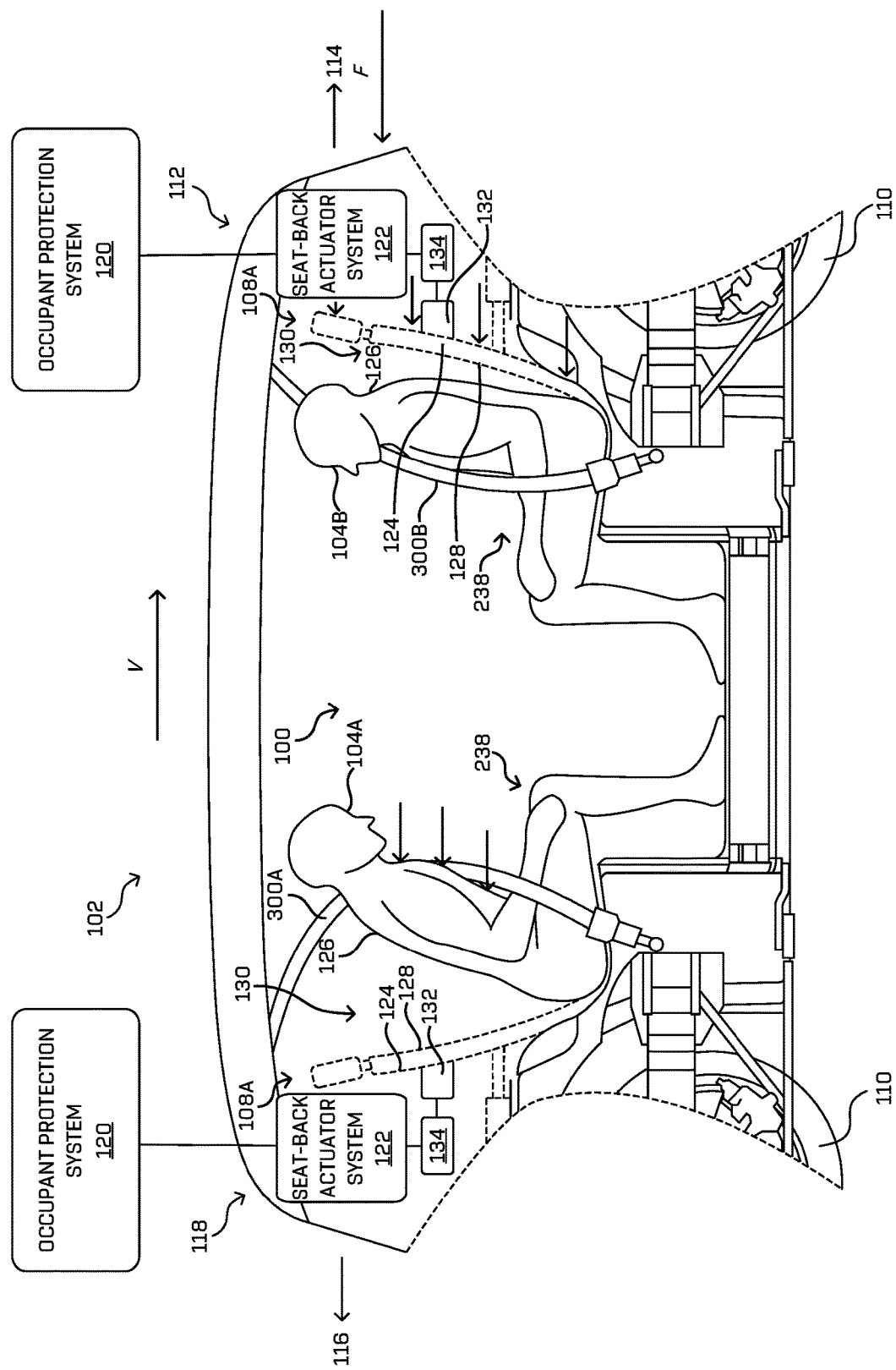
FIG. 3 is a cutaway side view of an example vehicle during a change in velocity consistent with a collision and including an example occupant protection system including a seat-back actuator system.

FIG. 3 is a cutaway side view of an example vehicle 102 during a triggering event, such as, for example, a predicted or actual change in velocity, and/or a predicted collision or an actual collision, and including an example occupant protection system 120, including an example seat-back actuator system 122. As shown in FIG. 3, the vehicle 102 is travelling at a velocity V in the first direction 114. A force F opposing the direction of travel is applied to the first end of the vehicle 102 in a direction generally consistent with the second direction 116. The occupant 104A is seated in the seat 106A facing in the direction of travel (i.e., the first direction 114), and the occupant 104B is seated in the seat 106B facing opposite the direction of travel, for example, with the back 126 of the occupant 104B facing the front surface 128 of the seat back 124. Prior to the collision, the back of the occupant 104B is spaced from the front surface 128 of the seat back 124 creating a space 130 therebetween.

As shown in FIG. 3, as the vehicle 102 begins to change velocity, for example, reduce its velocity due to braking and/or due to a collision with an object with the first end 112 of the vehicle 102, the occupant 104A is restrained by a seatbelt 300A of the seatbelt system 238, which may prevent the occupant 104A from being thrown from the seat 106A toward the occupant 104B and/or the seat 106B. Although the occupant 104B is wearing a seatbelt 300B, the seatbelt 300B, at least initially, does not restrain the occupant 104B during the change in velocity and/or collision. Rather, at least the back 126 of the occupant 104B will be thrown toward the front surface 128 of the seat back 124 in the direction of travel, at least unless, or until, the back 126 of the occupant 104B contacts the front surface 128 of the seat back 124.

Due in part to the space 130 between the back 126 of the occupant 104B and the front surface 128 of the seat back 124 of the seat 106B, the velocity of the back 126 of the occupant 104B will be substantially the same as the velocity of the vehicle 102 immediately prior to the reduction of the velocity of the vehicle 102 due to braking and/or the collision. The velocity of the back 126 of the occupant 104B will continue at this velocity until the back 126 of the occupant 104B contacts the front surface 128 of the seat back 124, at which time, the velocity of the back 126 of the occupant 104B will be subjected to an abrupt change in velocity as the seat back 124 stops the motion of the back 126 of the occupant 104B. This abrupt change in velocity may increase the likelihood and/or the severity of injury to the occupant 104B due to the collision.

In some examples, the seat-back actuator system 122 may be configured to move the front surface 128 of the seat back 124 of the seat 104B toward the back 126 of the occupant 104B before, during, and/or after the reduction in velocity of the vehicle 102 due to braking and/or the collision. In at least some instances, this may result in reducing a maximum rate of change of the velocity of at least a portion of the back 126 of the occupant 104B before, during, and/or after the collision, which may result in reducing the likelihood and/or severity of injury to the occupant 104B.

Some examples of the seat-back actuator system 122 may include an actuator controller 134 in communication with a seat-back actuator 132 and configured to activate the seat-back actuator 132 based at least in part, for example, on one or more signals received from the vehicle 102. For example, one or more of sensor system(s) 206, the localization component 220, the perception component 222, or the planning component 224 (see FIG. 2) may generate one or more triggering signals indicative of one or more of an actual change in velocity of the vehicle or a predicted change in velocity of the vehicle, for example, due to a predicted collision or actual collision involving the vehicle 102. For example, one or more of the sensor system(s) 206 may generate one or more signals indicative of an object (e.g., another vehicle, a wall, a guardrail, a bridge support, a utility pole, and/or a pedestrian) and communicate the one or more signals to the perception component 222 and/or the planning component 224, which may predict a collision with an object in the environment through which the vehicle 102 is travelling. The perception component 222 and/or planning component 224 may provide information to the seat-back actuator system 122, which in turn, provides one or more signals to the actuator controller 134, which may activate the seat-back actuator 132 to cause the front surface 128 of the seat back 124 to move toward at least a portion of the back 126 of the occupant 104, for example, as described herein.

In some examples, the seat-back actuator system 122 may be configured to receive one or more occupant presence signals indicative of a presence of an occupant 104 in a seat 106. In some such examples, the actuator controller may be configured to cause, based at least in part on the one or more occupant presence signals, the seat-back actuator 132 to move the at least a portion of the seat back 124 of the seat 106 toward at least a portion of the 126 back of the occupant 104, for example, in a direction opposite a direction of travel of the vehicle. In some examples, the seat-back actuator system 122 may be further configured to determine, based at least in part on the occupant presence signal, that the occupant 104 is facing rearward (e.g., opposite relative to a direction of travel of the vehicle 102), and cause, based at least in part on determining that the occupant 104 is facing rearward, the seat-back actuator 132 to move at least a portion of the seat back 124 of the seat 106 toward at least a portion of the back 126 of the occupant 104. In some examples, the movement of the at least a portion the seat or seat back 124 may be a translational movement, for example, not including a pivoting of the seat itself or a pivoting of the seat back 124 relative to the seat base. For example, the perception component 222 of the vehicle 102 may include an object classification system configured to determine information related, for example, to whether an occupant 104 is present in one or more of the respective seats 106 of the vehicle 102. In some examples, the object classification system may leverage one or more of the sensor system(s) 206 of the vehicle 102 and determine information about the occupant 104, such as, for example, the size and/or weight of the occupant 104 (e.g., whether the occupant 104 is an adult, a child, or an infant). For example, image systems (e.g., cameras) internal to the vehicle 102 may determine presence of an occupant 104 in a seat 106. If, for example, no occupant 104 is present in a seat 106, the actuator controller 134 may not activate the seat-back actuator 132. This may prevent unnecessary activation and prevent costs associated with servicing activated parts of the occupant protection system 120. Alternatively, if an occupant 104 is present in the seat 106, the actuator controller 134 may activate a seat-back actuator 132 associated with the position of the occupant 104 to protect the occupant 104 during the collision. In at least some examples, the type of occupant 104 detected may be used to inform other parameters of such a system (e.g., lower expansion rates for child occupants, etc.). In some examples, the seat-back actuator system 122 may be further configured to determine, based at least in part on the occupant presence signal, that the occupant 104 is facing forward (e.g., facing the same direction as a direction of travel of the vehicle 102), and cause, based at least in part on determining that the occupant 104 is facing forward, the seat-back actuator 132 to move at least a portion of the seat back 124 of the seat 106 toward at least a portion of the back 126 of the occupant 104.

The seat-back actuator system 120, in some examples, may be configured to receive one or more direction signals indicative of a direction of travel of the vehicle 102, and cause, based at least in part on the direction signal, the seat-back actuator 132 to move at least a portion of the seat back 124 the seat 106 toward at least a portion of the back 126 of the occupant 104. For example, the vehicle 102 may be a bi-directional vehicle configured to travel between locations with either end of the vehicle 102 being the leading end, for example, as described herein with respect to FIG. 1. In such vehicles, a seat 106 may be facing the direction of travel when the vehicle 102 is traveling with one end of the vehicle being the leading end, but with the seat 106 facing rearward with the other end of the vehicle 102 being the leading end. The vehicle 102 may include sensors and/or a system configured to generate one or more signals indicative of whether the vehicle 102 is traveling in a direction such that the seat 106 is facing forward (i.e., in the direction of travel) or the seat 106 is facing rearward (i.e., opposite the direction of travel). The seat-back actuator system 122 may be configured to prevent activation of the seat-back actuator 132 associated with the seat 106, even when occupied, for example, when the seat 106 is facing forward based at least in part on the signals. This may prevent unnecessary activation and costs associated with servicing activated parts of the occupant protection system 120. Alternatively, if the seat 106 is facing rearward and an occupant 104 is present in the seat 106, the actuator controller 134 may activate the seat-back actuator 132 associated with the position of the seat 106 to protect the occupant 104 during the collision, for example, as described herein. Although FIG. 3 shows two separate occupant protection systems 120 and two separate seat-back actuator systems 122 for clarity, some examples may include only a single occupant protection system 120 (or more than two) and/or only a single seat-back actuator system 122. (or more than two), for example, coupled to multiple seat-back actuators 134.

Figure 4:
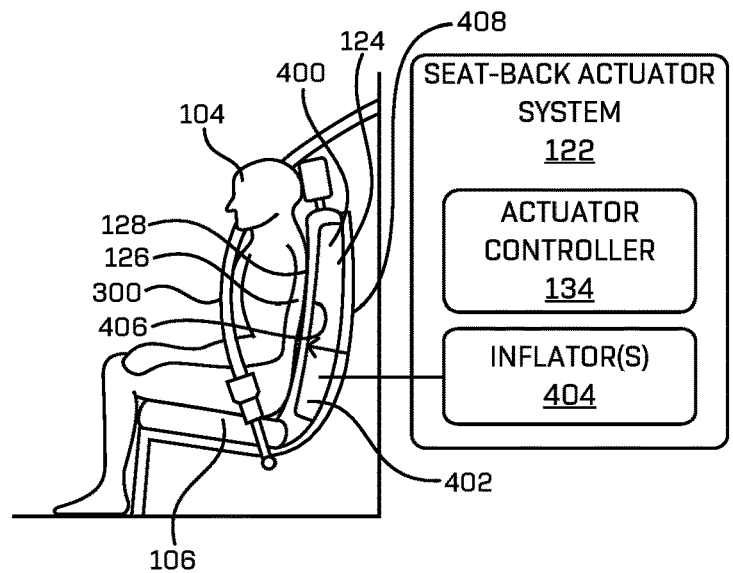
FIG. 4 is a schematic side view of an occupant in a seat during a collision in which the occupant is facing a direction opposite the direction of travel of the vehicle, with an example seat-back actuator system activated to protect the occupant.
Figure 5:
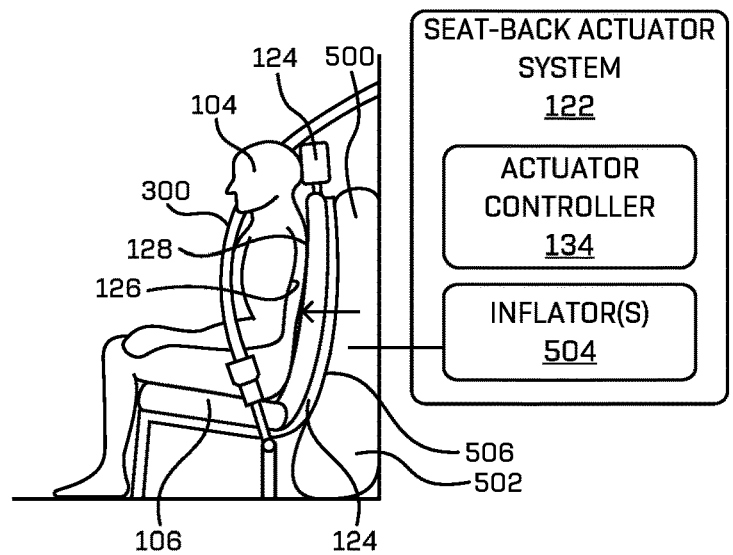
FIG. 5 is a side view of an occupant in a seat during a collision in which the occupant is facing a direction opposite the direction of travel of the vehicle with another example seat-back actuator system activated to protect the occupant.
Figure 6:
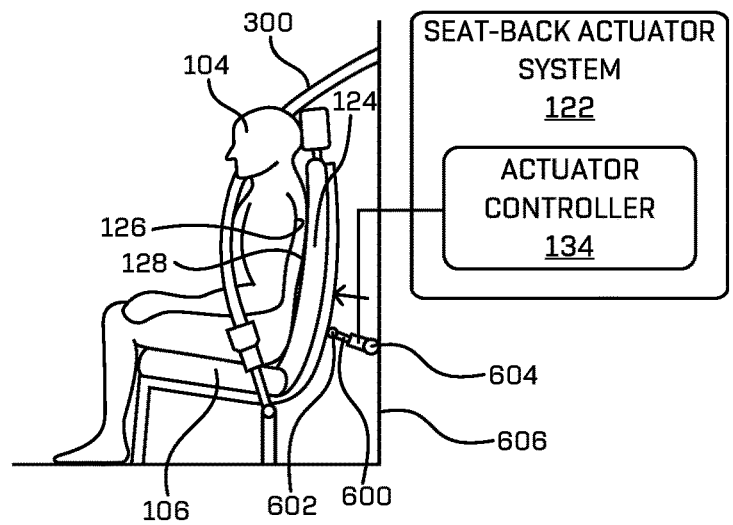
FIG. 6 is a side view of an occupant in a seat during a collision in which the occupant is facing a direction opposite the direction of travel of the vehicle with yet another example seat-back actuator system activated to protect the occupant.

FIGS. 4-6 are each a schematic side view of an occupant 104 in a seat 106 during a collision in which the occupant 104 is facing a direction opposite the direction of travel of the vehicle 102. FIG. 4 shows an example seat-back actuator 400 including an expandable bladder 402 configured to expand from a stowed state to a deployed state upon activation by the actuator controller 134. As shown in FIG. 4, the example seat-back actuator system 122 also includes one or more inflators 404 in flow communication with the expandable bladder 402 and configured to cause to the expandable bladder 402 expand from the stowed state to the deployed state, for example, as shown in FIG. 4. When expanded from the stowed state to the deployed state, the front surface 128 of the seat back 124 is moved toward the back of the occupant 104. The expandable bladder 402 may be formed from, for example, a woven nylon fabric and/or other similar materials, or materials having characteristics, for example, suitable for rapid expansion and/or elasticity. The one or more inflators 404 may include a gas generator, a pyrotechnic charge, propellants, any combination thereof, and/or any other suitable devices or systems.

As shown in FIG. 4, some examples of the seat back 124 define a cavity 406, and the expandable bladder 402 may be configured to be at least partially received (e.g., fully received) within the cavity 406. Some examples may have more than one cavity 406 and/or one or more expandable bladders 402 received in the one or more cavities 406. As noted herein, the front surface 128 of the seat back 124 may face toward at least a portion of the back 126 of the occupant 104, and the seat back 124 may include a rear surface 408 opposite the front surface 128, for example, facing away from the occupant 104 of the seat 106. In some such examples, the one or more cavities 406 may be defined between the front surface 128 and the rear surface 408, and the one or more expandable bladders 402 may be configured, upon activation, to generate a force to move the front surface 128 away from the rear surface 408, for example, such that the front surface 128 moves toward the back 126 of the occupant 104.

FIG. 5 is a side view similar to FIG. 4 with another example seat-back actuator 500 activated to protect the occupant 104. As shown in FIG. 5, the example seat-back actuator 500 includes an expandable bladder 502 configured to expand from a stowed state to a deployed state upon activation by the actuator controller 134. As shown in FIG. 5, the example seat-back actuator system 122 also includes one or more inflators 504 in flow communication with the expandable bladder 502 and configured to cause to the expandable bladder 502 to expand from the stowed state to the deployed state, for example, as shown in FIG. 5. When expanded from the stowed state to the deployed state, the front surface 128 of the seat back 124 is moved toward the back of the occupant 104. In some examples, only the seat back 124 is moved toward the back of the occupant 104, and in some examples, the entire seat is moved toward the back of the occupant 104. In some examples, the movement of the seat and/or seat back 124 may be a translational movement, for example, not including a pivoting of the seat itself or a pivoting of the seat back 124 relative to the seat base. The expandable bladder 502 may be formed from, for example, a woven nylon fabric and/or other similar materials, or materials having suitable characteristics. The one or more inflators 504 may include a gas generator, a pyrotechnic charge, propellants, any combination thereof, and/or any other suitable devices or systems. As shown in FIG. 5, in some examples, the seat-back actuator 500 is coupled to a rear surface 506 of the seat back 124, and the seat-back actuator 500 is configured to move the front surface 128 toward at least a portion of the back 126 of the occupant 106.

FIG. 6 is a side view similar to FIGS. 4 and 5 with yet another example seat-back actuator 600 activated to protect the occupant 106. For example, as shown in FIG. 6, a first portion 602 of the seat-back actuator 600 is coupled to the seat back 124 and a second portion 604 of the seat-back actuator 600 is coupled to the vehicle 102, for example, to a portion of the chassis 606. In some examples, the seat-back actuator 600 may include one or more of a pneumatic cylinder, a hydraulic cylinder, or an electric actuator. Other types of seat-back actuators 600 are contemplated.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 200 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 7:
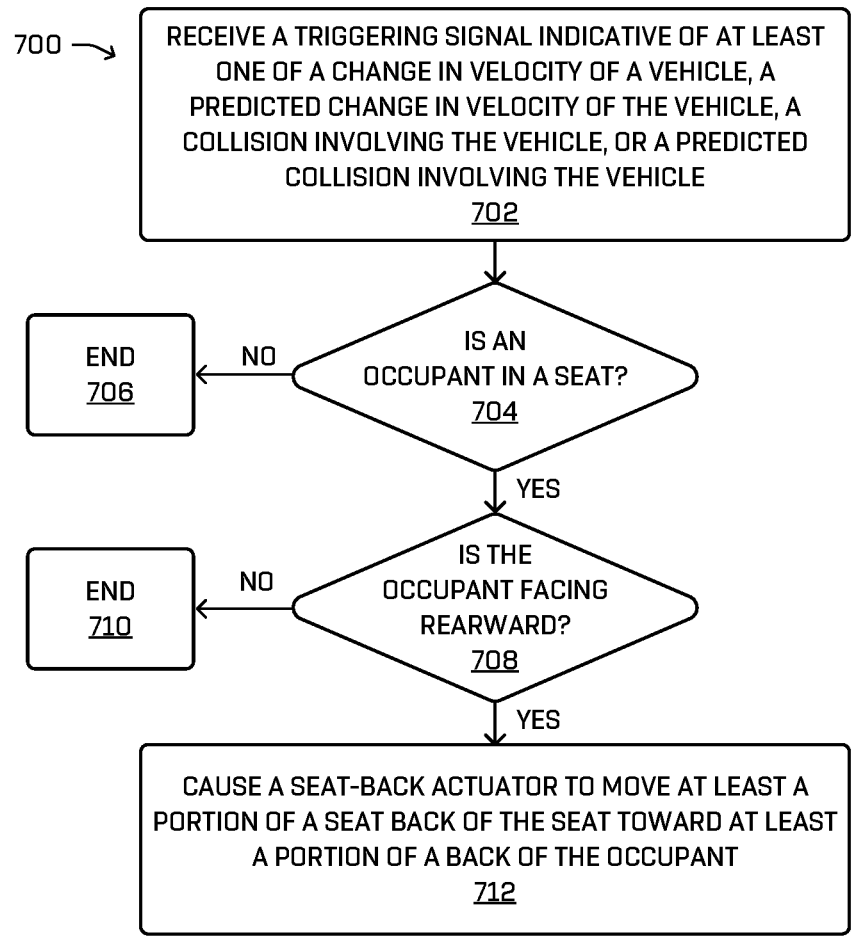
FIG. 7 is a flow diagram of an example process for activating a seat-back actuator of an occupant protection system.

FIG. 7 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an example process 700 for activating a seat-back actuator system. At 702, the example process 700 may include receiving a triggering signal indicative of, for example, at least one of a change in velocity of a vehicle, a predicted change in velocity of the vehicle, a collision involving the vehicle, or a predicted collision involving the vehicle. In some examples, the triggering signal may be indicative of the vehicle braking to avoid a collision or predicted collision, or a change in velocity of the vehicle due to a collision, for example, involving another vehicle or an object, in some examples, triggering signals may be generated by, for example, the perception and/or planning components and may be received by a seat-back actuator system and/or an actuator controller, for example, as described herein.

At 704, the example process 700 may include determining whether there is an occupant in a seat of the vehicle. This may include, for example, receiving an occupant presence signal indicative of a presence of an occupant in a seat, and determining, based at least in part on the occupant presence signal, whether an occupant is present n a seat. For example, an object classification system and/or other portions of vehicle systems may generate signals indicative of whether an occupant is present in a seat of the vehicle, and in some examples, one or more signals indicative of the seat in which the occupant is seated. In some examples, such signals may be received by the actuator controller, for example, as described herein. If not, the example process 700 may end at 706 without an actuator controller activating a seat-back actuator.

On the other hand, if there is an occupant present in a seat of the vehicle, the example process 700 may include, at 708, determining whether the occupant in the seat is facing rearward. For example, an object classification system and/or other portions of vehicle systems may generate signals indicative of the seat in which the occupant is seated. The process 700, in some examples, may include receiving a direction signal indicative of a direction of travel of the vehicle. Based at least in part on one or more of the occupant presence signal or the direction signal, the seat-back actuator system may be configured to determine whether the occupant is facing rearward. If not, the process 700, in some examples, may end at 710 without an actuator controller activating a seat-back actuator.

If, however, the process 700 determines the occupant is facing rearward, the process 700 may, at 712, cause, for example, based at least in part on the determining that the occupant is facing rearward, a seat-back actuator to move at least a portion of a seat back of the seat in which the occupant is present toward the at least a portion of the back of the occupant. In some examples, the seat-back actuator may include one or more expandable bladders and causing the seat-back actuator to move at least a portion of the seat back may include activating one or more inflators in flow communication with the one or more expandable bladders to deploy the one or more expandable bladders, for example, as described herein. In some examples, the seat-back actuator may include one or more of a pneumatic cylinder, a hydraulic cylinder, or an electric actuator, and causing the seat-back actuator to move at least a portion of the seat back may include causing the seat-back actuator to extend or retract, such that at least a portion of the seat back of the seat moves toward at least a portion of the back of the occupant, for example, as described herein.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example occupant protection system for a vehicle, the occupant protection system comprising:

a seat configured to be coupled to a vehicle, the seat comprising:

a seat base configured to support at least a portion of a weight of an occupant of the seat; and a seat back associated with the seat base and configured to provide support to a back of the occupant; and a seat-back actuator configured to move at least a portion of the seat relative to a portion of the vehicle and toward at least a portion of the back of the occupant; and an actuator controller in communication with the seat-back actuator and configured to:

receive a triggering signal indicative of one or more of a collision, a predicted collision, an actual change in velocity, or a predicted change in velocity; and cause, based at least in part on the triggering signal, the seat-back actuator to move at least a portion of the seat relative to the body of the vehicle and toward the at least the portion of the back of the occupant in a direction opposite a direction of travel of the vehicle.

B. The occupant protection system of example A, wherein the actuator controller is further configured to:

receive a seating signal indicative of an occupant seating position; and receive a directional signal indicative of the direction of travel of the vehicle, and wherein causing the seat-back actuator to move is further based at least n part on one or more of the seating signal or the directional signal.

C. The occupant protection system of example A or example B, wherein the seat back defines a cavity, and wherein the seat-back actuator is at least partially received within the cavity.

D. The occupant protection system of any one of example A through example C, wherein the seat back comprises a front surface configured to face toward the back of the occupant and a rear surface opposite the front surface, and wherein the seat-back actuator is associated with the rear surface of the seat back, and the seat-back actuator is configured to move the front surface toward the back of the occupant.

E. The occupant protection system of any one of example A through example D, wherein the seat-back actuator comprises at least one of an expandable bladder, a pneumatic cylinder, a hydraulic cylinder, or an electric actuator coupled to at least one of a portion of the vehicle or the seat back.

F. An example seat-back actuator system for a vehicle, the seat-back actuator system comprising:
a seat-back actuator configured to move at least a portion of a seat of a vehicle toward at least a portion of a back of an occupant of the vehicle; and
an actuator controller in communication with the seat-back actuator and configured to:
receive a triggering signal indicative of one or more of an actual change in velocity of the vehicle, a predicted change in velocity of the vehicle, a collision, or a predicted collision; and
cause, based at least in part on the triggering signal, the seat-back actuator to move the at least a portion of the seat toward the at least the portion of the back of the occupant in a direction opposite a direction of travel of the vehicle.

G. The seat-back actuator system of example F, wherein the actuator is further configured to:
receive a seating position of an occupant; and
receive a direction of travel of the vehicle, and
wherein causing the seat-back actuator to move the at least a portion of the seat is further based at least in part on one or more of the seating position or the direction of travel.

H. The seat-back actuator system of example F or example G, wherein the seat back actuator comprises an expandable bladder, and the system further comprises an inflator in flow communication with the expandable bladder and configured to cause to the expandable bladder to expand from the stowed state to the deployed state.

I. The seat-back actuator system of any one of example F through example H, wherein the at least the portion of the seat comprises a seat back defining a cavity, and the seat back actuator comprises an expandable bladder at least partially received within the cavity.

J. The seat-actuator system of any one of example F through example I, wherein the seat back actuator is further configured to:
receive an occupant presence signal indicative of a presence of an occupant in the seat; and
cause, based at least in part on the occupant presence signal, the seat-back actuator to move the at least the portion of the seat toward the at least the portion of the back of the occupant.

K. The seat-back actuator system of any one of example F through example J, wherein the at least the portion of the seat comprises a seat back defining a cavity, and wherein the seat-back actuator is at least partially received within the cavity.

L. The seat-back actuator system of any one of example F through example K, wherein the at least the portion of the seat comprises a seat back, the seat back comprising a front surface configured to face toward the at least a portion of the back of the occupant and a rear surface opposite the front surface, and wherein the seat-back actuator is coupled to the rear surface of the seat back, and the seat-back actuator is configured to move the front surface toward the at least a portion of the back of the occupant.

M. The seat-back actuator system of any one of example F through example L, wherein the seat-back actuator comprises at least one of an expandable bladder, a pneumatic cylinder, a hydraulic cylinder, or an electric actuator.

N. The seat-back actuator system of any one of example F through example M, wherein a first portion of the seat back actuator is coupled to the seat and a second portion of the seat back actuator is configured to be coupled to the vehicle.

O. An example method for protecting an occupant of a vehicle, the method comprising:
receiving a triggering signal indicative of at least one of an actual change in velocity of the vehicle, a predicted change in velocity of the vehicle, a collision, or a predicted collision; and
causing, based at least in part on the triggering signal, a seat-back actuator to move at least a portion of a seat relative to a portion of the vehicle and toward at least a portion of a back of the occupant in a direction opposite a direction of travel of the vehicle.

P. The method of example O, further comprising receiving an occupant presence signal indicative of a presence of an occupant in the seat, and causing, based at least in part on the occupant presence signal, the seat-back actuator to move the at least the portion of the seat toward the at least the portion of the back of the occupant.

Q. The method of example O or example P, further comprising determining, based at least in part on the occupant presence signal, that the occupant is facing rearward relative to a direction of travel of the vehicle, and causing, based at least in part on the determining that the occupant is facing rearward, the seat-back actuator to move the at least the portion of the seat toward the at least the portion of the back of the occupant.

R. The method of any one of example O through example Q, wherein the seat-back actuator comprises an expandable bladder, and causing the seat-back actuator to move the at least the portion of the seat comprises activating an inflator in flow communication with the expandable bladder to deploy the expandable bladder.

S. The method of one of example O through example R, wherein the seat-back actuator comprises at least one of an expandable bladder, a pneumatic cylinder, a hydraulic cylinder, or an electric actuator, and causing the seat-back actuator to move the at least the portion of the seat comprises causing the seat-back actuator to one of extend or retract.

T. The method of one of example O through example S, further comprising receiving a direction signal indicative of a direction of travel of the vehicle, and causing, based at least in part on the direction signal, the seat-back actuator to move the at least the portion of the seat toward the at least the portion of the back of the occupant.

What is claimed is:
1. An occupant protection system for a vehicle, the occupant protection system comprising:

a seat configured to be coupled to a vehicle and facing a first direction, the seat comprising:
  a seat base configured to support at least a portion of a weight of an occupant of the seat;
  a seat back associated with the seat base configured to provide support to a back of the occupant; and
  a seat-back actuator configured to move at least a portion of the seat relative to a portion of the vehicle and toward at least a portion of the back of the occupant; and
an actuator controller in communication with the seat-back actuators and configured to:
  receive a triggering signal indicative of one or more of a collision, a predicted collision, an actual change in velocity, or a predicted change in velocity;
  receive a directional signal indicative of a direction of travel of the vehicle; and
  cause, based at least in part on the triggering signal, activation of:
    the seat-back actuator when the directional signal indicates a second direction opposite the first direction,
    wherein the activation causes an application of a force to the seat back to move at least the portion of the seat relative to the portion of the vehicle and toward the back of the occupant.

2. The occupant protection system of claim 1, wherein the actuator controller is further configured to:
  receive a seating signal indicative of an occupant seating position,
  wherein causing the activation of the seat-back actuator is further based at least in part on the seating signal.

3. The occupant protection system of claim 1, wherein the seat back defines a cavity, and wherein the seat-back actuator is at least partially received within the cavity.

4. The occupant protection system of claim 1, wherein the seat back comprises a front surface configured to face toward the back of the occupant and a rear surface opposite the front surface, and the seat-back actuator is configured to move the front surface of the seat back toward the back of the occupant.

5. The occupant protection system of claim 1, wherein the seat-back actuator comprises at least one of an expandable bladder, a pneumatic cylinder, a hydraulic cylinder, or an electric actuator.

6. A seat-back actuator system for a vehicle, the seat-back actuator system comprising:
  a set of seat-back actuators associated with a set of seats facing a first direction, the set of seat-back actuators configured to apply a force to move a portion of the set of seats toward a back of an occupant of the set of seats; and
  an actuator controller in communication with the set of seat-back actuators and configured to:
    receive a triggering signal indicative of one or more of an actual change in velocity of the vehicle, a predicted change in velocity of the vehicle, a collision, or a predicted collision;
    receive a directional signal indicative of a direction of travel of the vehicle; and
    cause, based at least in part on the triggering signal and the directional signal, activation of:
      at least one of the set of seat-back actuators to apply the first force when the directional signal indicates the second direction.

7. The seat-back actuator system of claim 6, wherein the actuator controller is further configured to:
  receive a seating position of an occupant of the vehicle,
  wherein causing the activation of the at least one of the seat-back actuators is further based at least in part on the seating position.

8. The seat-back actuator system of claim 6, wherein individual of the set of seat-back actuators comprise an expandable bladder, and the system further comprises an inflator in flow communication with the expandable bladder and configured to cause to the expandable bladder to expand from a stowed state to a deployed state.

9. The seat-back actuator system of claim 8, wherein individual of the set of seats comprise:
  a seat back defining a cavity; and
  the expandable bladder is at least partially received within the cavity.

10. The seat-back actuator system of claim 9, wherein the actuator controller is further configured to:
  receive an occupant presence signal indicative of a presence of an occupant in the seat; and
  cause, based at least in part on the occupant presence signal, the activation of the at least one of the set of seat-back actuators.

11. The seat-back actuator system of claim 9, wherein the set of seat-back actuators comprise an expandable bladder.

12. The seat-back actuator system of claim 6, wherein individual of the set of seats comprise:
  a seat back comprising a front surface configured to face toward the back of the occupant and a rear surface opposite the front surface; and
  a seat-back actuator configured to move the front surface toward the portion of the back of the occupant.

13. The seat-back actuator system of claim 6, wherein individual of the set of seat-back actuators comprises at least one of an expandable bladder, a pneumatic cylinder, a hydraulic cylinder, or an electric actuator.

14. The seat-back actuator system of claim 13, wherein the set of seat-back actuators are coupled at a first end to the seat and at a second end to the vehicle.

15. A method for protecting an occupant of a vehicle, the method comprising:
  receiving a triggering signal indicative of at least one of an actual change in velocity of the vehicle, a predicted change in velocity of the vehicle, a collision, or a predicted collision;
  receiving a directional signal indicative of a direction of impact; and
  causing, based at least in part on the triggering signal, activation of:
    a seat-back actuator associated with a seat facing a direction when the directional signal indicates a direction of impact, activation of the seat-back actuator causing application of a force to a rear surface of the seat to move at least a portion of the seat toward a back of an occupant of the seat.

16. The method of claim 15, further comprising receiving an occupant presence signal indicative of a presence of the occupant, and wherein causing the activation of the seat-back actuator is based at least in part on the occupant presence signal.

17. The method of claim 16, wherein the direction of impact is opposite the direction.

18. The method of claim 15, wherein the seat-back actuator comprises an expandable bladder, and the activation of the seat-back actuator comprises activating an inflator in flow communication with the expandable bladder to deploy the expandable bladder.

19. The method of claim 15, wherein the seat-back actuator or the second seat-back actuator comprises at least one of an expandable bladder, a pneumatic cylinder, a hydraulic cylinder, or an electric actuator, and the activation of the first seat-back actuator or the second seat-back actuator comprises causing a portion of the at least one of the first seat-back actuator or the second seat-back actuator to one of extend or retract.

20. The method of claim 15, wherein the seat-back actuator is a first seat-back actuator associated with a first seat facing a first direction, the method further comprising:
   causing activation of a second seat-back actuator associated with a second seat facing a second direction opposite the first directing when the directional signal indicates a second direction of impact, activation of the second seat-back actuator causing application of a second force to a rear surface of the second seat.

21. The occupant protection system of claim 1, further comprising:
   a second seat configured to be coupled to the vehicle and facing the second direction, the second seat having a second seat back actuator configured to move at least a portion of the second seat relative to a portion of the vehicle and toward at least a portion of a back of a second occupant of the second seat,
   the actuator controller further configured to cause, based at least in part on the triggering signal, activation of the second seat back actuator when the directional signal indicates the first direction.

22. The seat-back actuator system of claim 6, further comprising a second set of seat-back actuators associated with a second set of seats facing a second direction opposite the first direction, the second set of seat-back actuators configured to apply a second force to move a portion of the second set of seats toward a back of a second occupant of the second set of seats,
   wherein the actuator controller is further configured to cause activation of at least one of the second set of seat-back actuators based on the triggering signal and the directional signal.

* * * * *